US009225563B1

(12) United States Patent
Milirud et al.

(10) Patent No.: US 9,225,563 B1
(45) Date of Patent: Dec. 29, 2015

(54) PROGRAMMABLE PASSIVE PEAKING EQUALIZER

(71) Applicant: PMC-SIERRA US, INC., Sunnyvale, CA (US)

(72) Inventors: Vadim Milirud, Vancouver (CA); Predrag Acimovic, Burnaby (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 236 days.

(21) Appl. No.: 13/826,511

(22) Filed: Mar. 14, 2013

Related U.S. Application Data (60) Provisional application No. 61/640,360, filed on Apr. 30, 2012.

(51) Int. Cl.
*H04L 25/03* (2006.01)

(52) U.S. Cl.
CPC ................ *H04L 25/03878* (2013.01)

(58) Field of Classification Search
CPC .......... H04B 3/14; H04B 3/145; H04B 3/148; H04L 25/03878
USPC ..................................................... 333/28 R
See application file for complete search history.

(56) References Cited

U.S. PATENT DOCUMENTS

| 3,303,437 | A | * | 2/1967 | De Monte .................. 333/28 R |
| 7,586,987 | B2 | | 9/2009 | Vorenkamp et al. |
| 7,671,694 | B2 | | 3/2010 | Yeung et al. |
| 8,115,566 | B2 | | 2/2012 | Chou et al. |
| 2007/0230640 | A1 | * | 10/2007 | Bryan et al. .................. 375/349 |
| 2009/0261452 | A1 | * | 10/2009 | Tsujimoto et al. ............ 257/531 |
| 2009/0302954 | A1 | * | 12/2009 | Chen et al. ...................... 331/66 |
| 2012/0076181 | A1 | * | 3/2012 | Aziz et al. ..................... 375/219 |

OTHER PUBLICATIONS

Gondi et al., "Equalization and Clock and Data Recovery Techniques for 10-Gb/s CMOS Serial-Link Receivers", IEEE Journal of Solid-State Circuits, Sep. 2007, vol. 42, No. 9, pp. 1999-2011.
Zhang et al., "A 10 Gb/s BiCMOS Adaptive Cable Equalizer", IEEE Journal of Solid-State Circuits, Nov. 2005, vol. 40, No. 11, pp. 2132-2140.

\* cited by examiner

*Primary Examiner* — Stephen E Jones
*Assistant Examiner* — Scott S Outten
(74) *Attorney, Agent, or Firm* — Dennis R. Haszko (57) ABSTRACT

A programmable passive peaking equalizer that can compensate for a frequency dependent loss of a variety of data channels is disclosed herein. Monotonic increase in signal loss vs. frequency of board traces, cables and even fiber causes significant distortion of transmitted data referred to as intersymbol interference (ISI). Some embodiments of programmable passive equalizers disclosed herein can minimize ISI for a wide range of data channels with very low power penalty. Various embodiments of the passive equalizer can program the amount of peaking that occurs at the Nyquist frequency of the data rate, and hence compensates for high frequency signal loss. This in turn equalizes the high frequency patterns in the transmitted data stream, effectively eliminating the worst case ISI.

10 Claims, 8 Drawing Sheets

PROGRAMMABLE PASSIVE PEAKING EQUALIZER

CROSS REFERENCE TO RELATED APPLICATIONS

This application claims the benefit of priority of U.S. Provisional Patent Application No. 61/640,360 filed Apr. 30, 2012, which is incorporated herein by reference in its entirety.

FIELD

The present disclosure generally relates to electronics, and more particularly, to high speed data links for integrated circuit devices.

BACKGROUND

Continuously growing demand for higher network capacity has pushed the bitrates of current broadband systems to higher levels as compared to past systems. Broadband systems use digital signals, where information is coded using short electrical pulses. Improvements in communication systems are generally desirable.

The above information is presented as background information only to assist with an understanding of the present disclosure. No determination has been made, and no assertion is made, as to whether any of the above might be applicable as prior art with regard to the present invention.

BRIEF DESCRIPTION OF THE DRAWINGS

Embodiments of the present disclosure will now be described, by way of example only, with reference to the accompanying figures.

DETAILED DESCRIPTION

Continuously growing demand for higher network capacity has pushed the bitrates of current broadband systems to 10, 20 even 40 Gb/s. At these bitrates, it is no longer possible to neglect the bandwidth limitations of the data channel. Broadband systems use digital signals, where information is coded using short electrical pulses each having a duration equal to 1/bitrate. High frequency pulses propagating along the bandwidth limited channels interfere with each other, loosing clearly defined logical levels (−V/+V) and could lead to loss of signal.

Figure 1A:
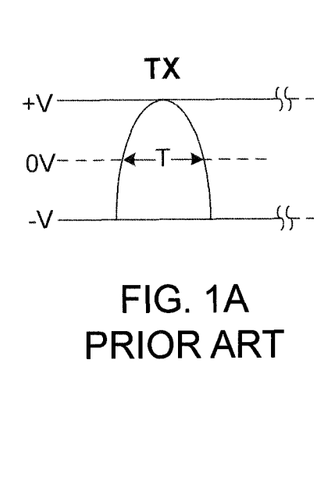
FIG. 1A illustrates a pulse response at a TX.
Figure 1B:
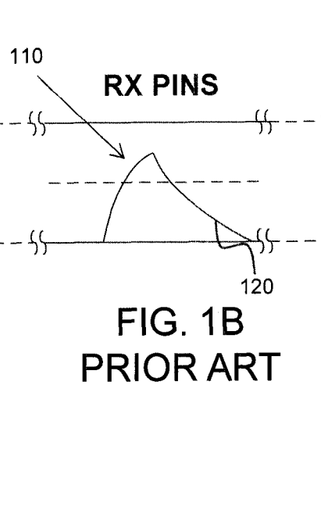
FIG. 1B illustrates a pulse response at an RX input.
Figure 1C:
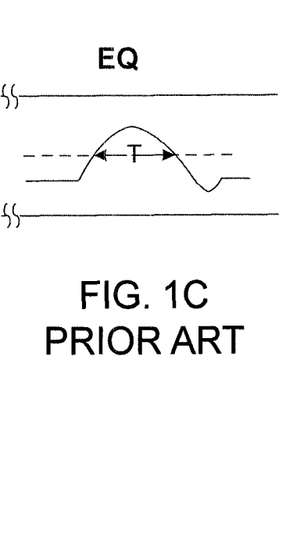
FIG. 1C illustrates a pulse response at a passive equalizer output.

The problem can be illustrated in the time domain using a pulse response as shown in FIGS. 1A, 1B and 10. These figures illustrate the pulse response at three points along the channel: Transmitter (TX) output (FIG. 1A); Receiver (RX) input (FIG. 1B); and Passive equalizer output (FIG. 10). As shown in FIG. 1A, at the transmitter output the pulse has equal rise/fall times and the pulse width (pulse duration) at the zero crossing is equal to 1/bitrate, defined as (T). Pulses traveling along the bandwidth limited channel become distorted. As can be seen from FIG. 1B, the distorted pulse 110 can have a tail 120 that may interfere with an adjacent pulse, thereby causing inter symbol interference (ISI). At low frequencies, the channel's insertion loss exhibits nearly unity gain, while significant attenuation at the Nyquist frequency (equal to 0.5*data rate) can be observed. The term channel can refer to any applicable transmission channel, including but not limited to cables and traces. Most of the signal energy is contained from DC to the Nyquist frequency and hence the pulse width of the pulse response is significantly reduced.

A traditional passive equalizer's operation is more accurately described by de-emphasis of maximum (DC) logical voltage swing (−V/+V), while leaving the gain at the Nyquist frequency unchanged. The equalized signal will have a pulse width at the zero crossing that is closer to the pulse width at the zero crossing of the originally transmitted pulse than that of the pulse received at the equalizer, thereby providing lower ISI.

The disadvantage of the traditional passive equalizer (EQ) is that a gain stage with sufficient gain to restore the logic swing is required after the EQ. The gain stage requires power to be supplied to it. Thus, a system utilizing a traditional passive equalizer has a power penalty in that it requires the input of additional power. Moreover, such a system may require extra additional components, wires, traces, or area to supply the power. The consumption of additional power would generally result in poorer power efficiency and the generation of excess heat.

Some embodiments of the present disclosure provide a variable analog peaking equalizer that partially equalizes ISI from a channel with no power penalty. Some embodiments of the present disclosure can replace or supplement DSP equalization to optimize overall system performance. Various embodiments of the present disclosure use coupled inductors to perform the peaking and variable resistors to control the amount of peaking.

Various embodiments disclosed herein relate to a programmable passive peaking equalizer that can compensate for a frequency dependent loss of a variety of data channels is disclosed herein. Monotonic increase in signal loss vs. frequency of board traces, cables and even fiber causes significant distortion of transmitted data referred to as inter-symbol interference (ISI). Some embodiments of programmable passive equalizers disclosed herein can minimize ISI for a wide range of data channels with very low power penalty. Various embodiments of the passive equalizer can program the amount of peaking that occurs at the Nyquist frequency of the data rate, and hence compensates for high frequency signal loss. In some embodiments, this in turn equalizes the high frequency patterns in the transmitted data stream, effectively eliminating the worst case ISI.

Some embodiments of the present disclosure, described in detail below, equalize high frequency content (emphasis) without reducing the logic swing.

Figure 2A:
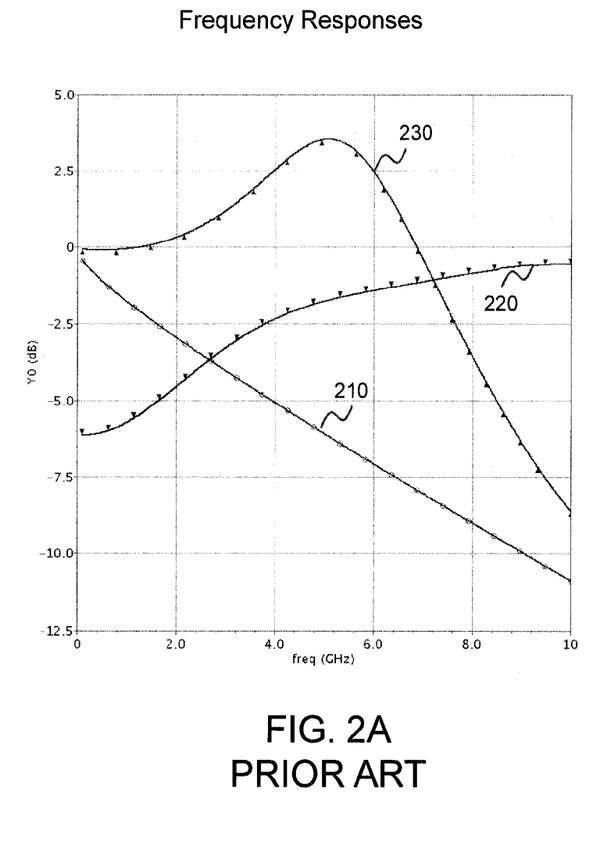
FIG. 2A illustrates channel loss, EQ PriorArt and EQ Embodiment of Disclosure magnitude responses.
Figure 2B:
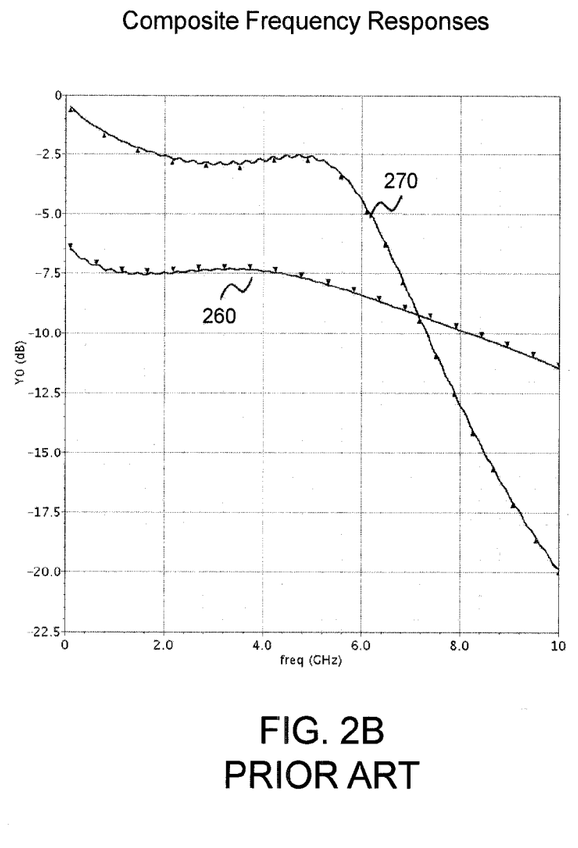
FIG. 2B illustrates Composite Response: Channel+EQ PriorArt and Channel+EQ Embodiment of Disclosure.

FIGS. 2A and 2B illustrate the channel frequency response and stand alone EQ magnitude responses for both prior approaches and embodiments of the present disclosure. The composite response that is described above is captured as well. In the example of FIGS. 2A and 2B, the system is meant to equalize a channel for a data rate of 10 Gb/s (i.e. up to a Nyquist Frequency of 5 GHz).

FIG. 2A illustrates the channel loss in plot 210, the magnitude response of a known equalizer in plot 220, and the magnitude response of an equalizer according to some embodiments of the present disclosure in plot 230.

The channel, shown in plot 210, exhibits a frequency dependent loss which is monotonically increases vs. frequency. The slope is a function of channel length, but it is almost a linear function of the frequency (ignoring very low and very high frequency effects). At the Nyquist frequency, the channel loss is 6 dB. An ideal equalization would be equal to the inverse of the channel response. A circuit that would achieve such an equalization would 0 dB gain at DC and 6 db gain at 5 GH/z. Such a circuit would be an active equalizer.

An ideal passive equalizer (de-emphasis) would have a gain of −6 dB at DC and a gain of 0 dB at 5 GH/z. The composite response of such an equalizer and the channel would be a flat line at −6 dB from DC to 5 GHz. In such a situation, although the signal levels would be attenuated as compared to the original pulse from the transmitter, the pulses that leave equalizer would exhibit zero ISI.

A typical equalizer will compensate for the channel loss within a limited frequency range. Plot 220, shows a known passive equalizer, that has gain of −6 dB at DC and −2 dB at frequency of 5 GHz. Note that plot 220 has an approximately linear response only between 1 GHz-4 GHz.

The response of a passive peaking equalizer according to various embodiments disclosed herein is shown in plot 230. As can be seen from the figure, the various embodiments of the equalizer have a gain of 0 dB at DC and a gain of 4 dB at the frequency of 5 GHz. Given that it is a peaking equalizer, its linear response region is smaller (between about 3 GHz and 4.5 GHz) as compared to an active equalizer.

FIG. 2B illustrates the composite responses: Plot 260 illustrates the combined response of the channel and a known equalizer. Plot 270 illustrates the combined response of the channel and an equalizer according to various embodiments of the present disclosure in plot 270. The composite is flat for both equalizers within a frequency range mentioned earlier. The peaking equalizer will exhibit narrower equalized range; however it will exhibit less attenuation. The residual ISI could be equalized further in the following DSP block.

Coupled Inductors: Equivalent Model

Figure 3A:
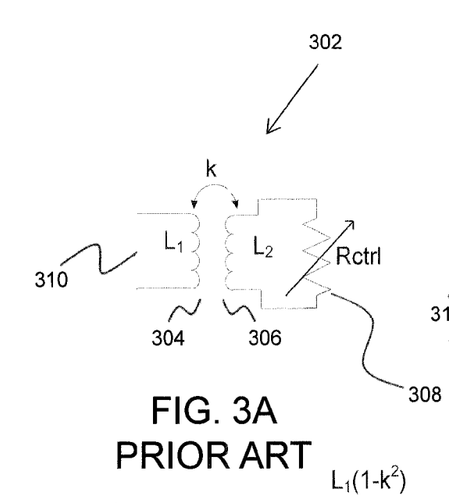
FIGS. 3A, 3B, and 3C illustrate equivalent circuits according to a coupled inductor (k<1) equivalent model.
Figure 3B:
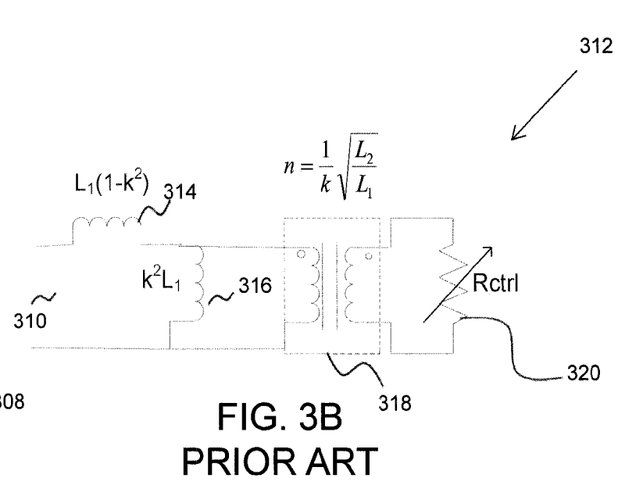
Figure 3C:
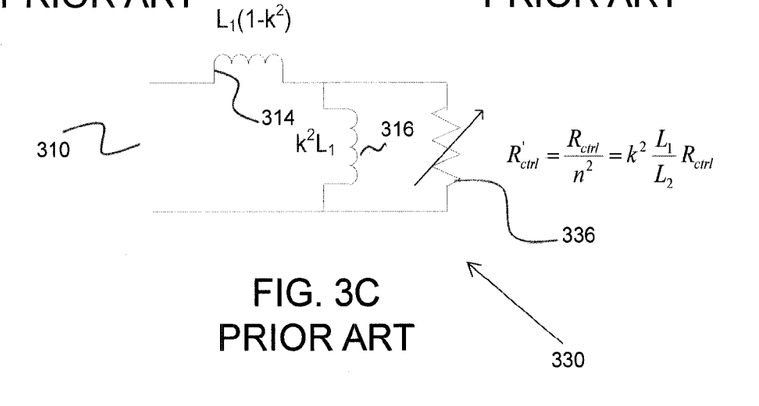

For two loosely coupled inductors (k<1, where k is the coupling coefficient) such as in the circuit 302 of FIG. 3A, an equivalent model can be derived using an ideal transformer as shown in FIGS. 3B and 3C. Circuit 302 of FIG. 3A comprises inductor 304 magnetically coupled to inductor 306. Inductor 306 is coupled in parallel with variable resistor 308. Variable resistor 308 can be, for example, a programmable resistor. Inductor 304 has an inductance $L_1$, inductor 306 has an inductance $L_2$ and the variable resistor 308 is set to a resistance value of Rctrl.

Looking through the terminals from direction 310, that is from the primary side ($L_1$), an equivalent circuit 312 can be represented (as shown in FIG. 3B) by a series inductor 314 with inductance $L_1(1-k^2)$, a shunt inductor 316 with inductance $k^2(L_1)$, an ideal transformer 318 with turn ratio equal to n, and a resistor 320 with resistance Rctrl. The value of n can be represented as $$n = \frac{1}{k}\sqrt{\frac{L_1}{L_2}}.$$

The shunt inductor 316 represents the finite inductance of inductor 304. The series inductor 314 represents a magnetic flux loss due to the loose coupling (k<1) of inductors 304 and 306. To achieve a high frequency response, the coupling should be as tight as possible.

Using voltage/current relationships for the ideal transformer the model could be simplified even further as shown in FIG. 3C. $R_{CTRL}$ could be transformed to the primary side, resulting in a simple equivalent circuit 330 that will be used to describe embodiments of the present disclosure. Circuit 330 comprises inductors 314 and 316, and variable resistor 336 having resistance value of $$R'_{ctrl} = \frac{R_{ctrl}}{n^2} = k^2\frac{L_1}{L_2}R_{ctrl}.$$

Consider two cases when: (1) $R_{CTRL}=0$, the resulting inductance is equal to $L_1(1-k^2)$; and (2) $R_{CTRL}=\infty$, the resulting inductance is equal to $L_1$.

Thus, using a programmable or variable resistor, the inductance value could be adjusted within the range: {$L_1$ to $L_1(1-k^2)$}.

High-speed state of the art equalizers are extensively used in broadband data communication applications. Traditional equalizers for multi-gigabit rates (>10 Gbs) are generally power hungry, sophisticated analog circuits. The control of such circuits is also generally very complicated and generally requires calibration and tuning of multiple circuit parameters.

There is a trend towards DSP based receivers, where most of the signal processing is done after the signal is converted from analog to digital by analog to digital (A/D) converters. Since functions such as equalization and clock and data recovery (CDR) are moved into the digital domain, simple and low power pre-processing can be implemented before the signal is digitized. Having a simple analog processing before the A/D converters could simplify the design of the A/D converters and reduce the number of quantization levels required as well.

Various embodiments of the present disclosure include a programmable passive peaking equalizer, providing a simple and an elegant solution which combines programmability, robustness, and low power requirements, while having a simple control mechanism.

Programmable Peaking Equalizer

Figure 4:
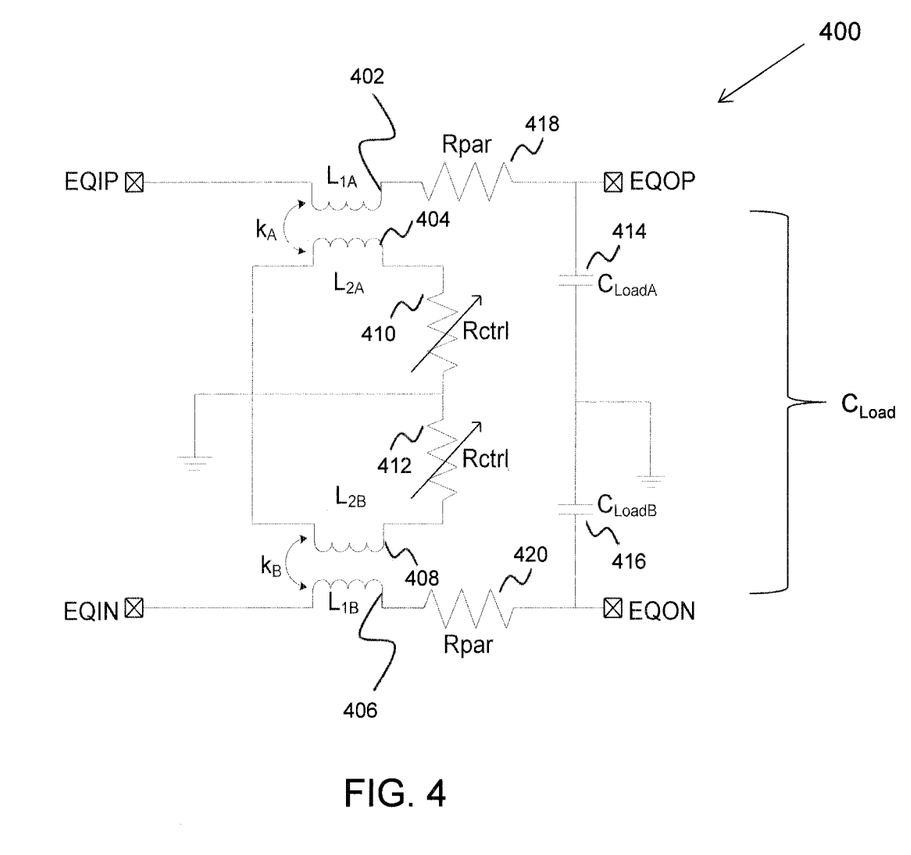
FIG. 4 illustrates a programmable passive peaking equalizer according to an embodiment of the present disclosure.

A programmable passive peaking equalizer according to example embodiments of the present disclosure is shown in FIG. 4. FIG. 4 illustrates the effective circuit 400 for an equalizer according to embodiments of the present disclosure coupled to an ADC. In other words, FIG. 4 includes circuit components that not only belong to the equalizer itself but also includes circuit elements representative of other components or the effect of other components. For example, FIG. 4 illustrates parasitic resistances from metal routing and the input capacitance of the ADC to which the equalizer is coupled.

The circuit of FIG. 4 is used in differential communication. Accordingly, circuit 400 includes input ports EQIP and EQIN for the input of the positive and negative signals respectively, and output ports EQOP and EQON for the output of the positive and negative signals respectively. Circuit 400 includes two pairs of via loosely mutually coupled inductors. The first pair comprises inductors 402 and 404 having inductances $L_{1A}$ and $L_{2A}$, respectively. The second pair comprises inductors 406 and 408 having inductances $L_{1B}$ and $L_{2B}$, respectively. Variable resistors 410 and 412 change the inductance of the circuit via the loosely mutually coupled inductors. The voltage across the input capacitance of the ADC ($C_{Load}$), which is represented by the series connection of capacitors 414 and 416 (having capacitances $C_{LoadA}$ and $C_{LoadB}$ respectively), is amplified around the Nyquist frequency. The Nyquist frequency should coincide with the resonance frequency of the series $RL_{eq}C$ circuit, formed by the input capacitance of the ADC ($C_{LOAD}$), the parasitic resistance of the metal routing (represented by resistors 418 and 420) and the equivalent inductor $L_{eq}$ seen across the terminals of inductors 402 and 406.

Figure 5A:
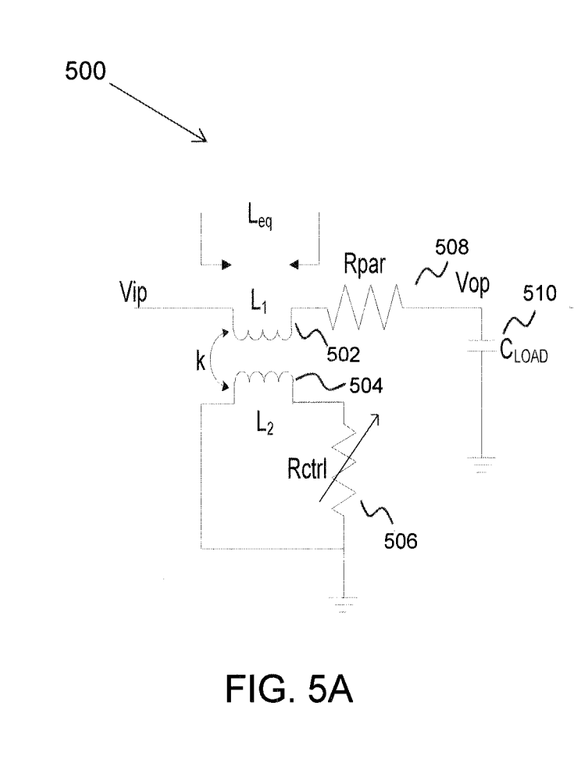
FIG. 5A illustrates a programmable peaking equalizer single ended embodiment.

A single-ended programmable passive peaking equalizer according to various embodiments is shown in FIG. 5A. The circuit 500 of FIG. 5A includes inductors 502, 504 and variable resistor 506, which in some embodiments is a programmable resistor. Inductors 502 and 504 have inductances $L_1$ and $L_2$ respectively. Similar to circuit 400 of FIG. 4, circuit 500 also includes resistor 508, which represents the parasitic resistance and capacitor 510, which represents the input capacitance of the circuit to which the equalizer is coupled. The resistance of variable resistor is designated as $R_{par}$. Capacitor 508 has a capacitance value of $C_{LOAD}$. The voltage at the input of the equalizer is represented as Vip and the voltage at the output of the equalizer is represented as Vop.

Figure 5B:
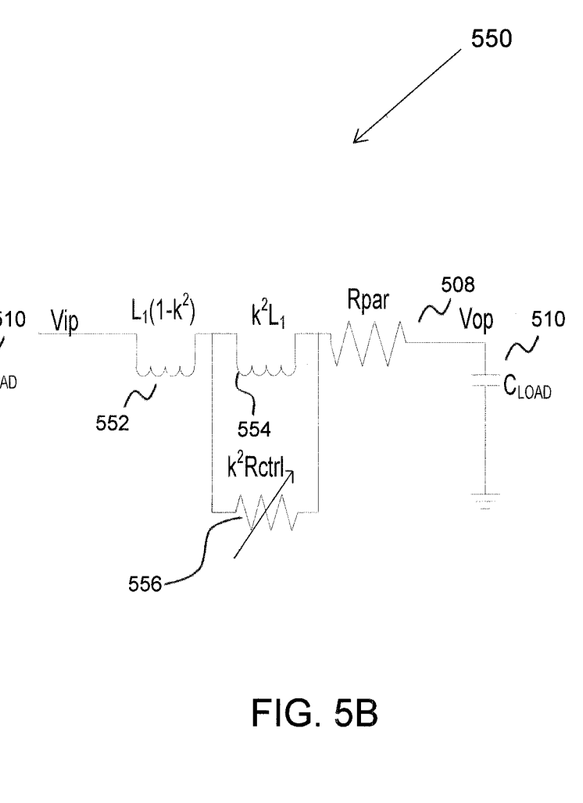
FIG. 5B illustrates an equivalent model of a programmable peaking equalizer single ended embodiment.

The equivalent coupled inductors model derived above is used to derive the transfer function of the peaking circuit. FIG. 5B illustrates an equivalent model of the programmable peaking equalizer illustrated in FIG. 5A. Circuit 550 of FIG. 5B includes inductor 552, inductor 554, and variable resistor 556. Resistor 508 represents the parasitic resistance and capacitor 510 illustrates the input capacitance of the circuit to which the equalizer is coupled. Inductor 552 has an inductance $L_1(1-k^2)$ and inductor 554 has an inductance of $k^2L_1$. Variable resistor has a resistance of $k^2R_{ctrl}$.

The transfer function of the proposed peaking equalizer is given in the equation below. The peaking frequency is determined by $C_{LOAD}$ and $L_1$ using the relationship $w_0=1/\text{sqrt}(C_{LOAD}*L_1)/6.28$.

$$T(s) = \frac{sL_1 + R_{CTRL}}{s^3L_1^2C_{LOAD}(1-k^2) + s^2L_1C_{LOAD}(R_{CTRL}+R_{PAR}) + s(L_1 + C_{LOAD}R_{PAR}R_{CTRL}) + R_{CTRL}}$$

Figure 6:
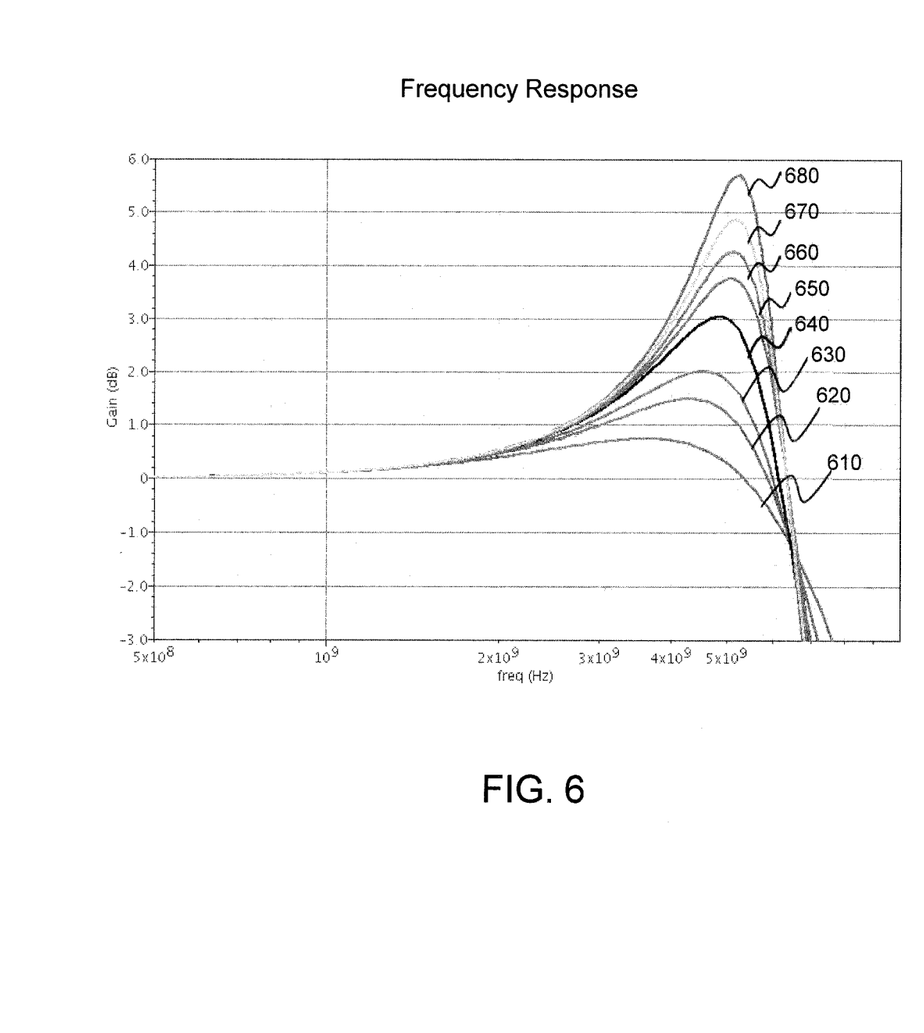
FIG. 6 illustrates a transfer function of a programmable peaking equalizer of embodiment of present disclosure.

The amount of peaking is controlled by $R_{CTRL}$ as shown in FIG. 6. FIG. 6 illustrates a graph of the frequency response of the circuit of FIG. 5A for different values of $R_{ctrl}$. Curves 610, 620, 630, 640, 650, 660, 670, and 680 correspond to variable resistance values of 50Ω, 100Ω, 150Ω, 200Ω, 300Ω, 450Ω, 700Ω, and 1000Ω, respectively. The gain at DC is equal to unity. The circuit parameters in Table 1 are used to demonstrate the operation using an example of a 10 Gb/s equalizer.

TABLE 1

Circuit parameter used to demonstrate 10 Gb/s operation

| Parameter | Value | Units | Comments |
|---|---|---|---|
| $C_{load}$ | 250 | fF | |
| $L_1$ | 3 | nH | |
| $L_2$ | 3 | nH | |
| k | 0.8 | | |
| $R_{par}$ | 50 | Ohm | $R_{par}$ used in the Transfer function includes resistances of TX and RX terminations (50 Ohm RX driven with 50 Ohm TX equal to 25 Ohm in series). This resistance appears in series with RLC circuit. |
| $R_{CTRL}$ | 50 -:- 1000 | Ohm | |

The passive equalizer according to various example embodiments of the present disclosure has a programmable gain around the Nyquist frequency and has a unity gain at DC. Therefore, in such an embodiment, an additional gain stage is not required to restore the signal swing.

As implied by its name, the peaking equalizer of some embodiments of the present disclosure mostly compensates for losses around the Nyquist frequency. Therefore a perfect equalization does not occur in various embodiments, but for mildly lossy channels, perfect equalization is not required. If channel loses are more significant, it can be followed by a powerful DSP engine.

Figure 7A:
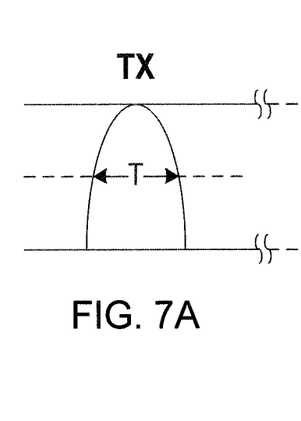
FIG. 7A illustrates a pulse response at a TX output according to an embodiment of present disclosure.
Figure 7B:
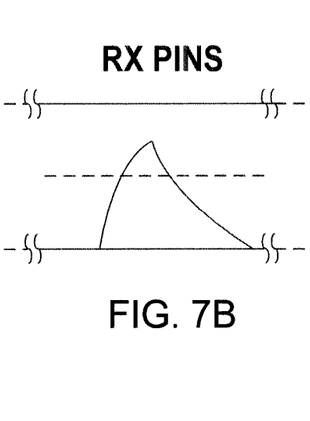
FIG. 7B illustrates a pulse response at an RX input of embodiment of present disclosure.
Figure 7C:
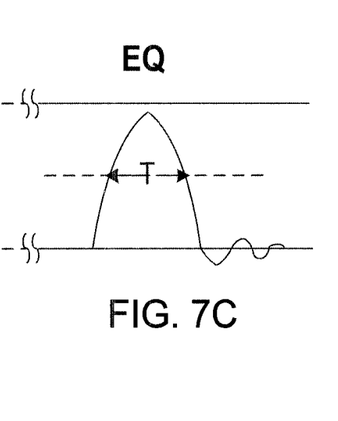
FIG. 7C illustrates a pulse response at an equalizer output of embodiment of present disclosure.

The resulting signal will have a zero-crossing pulse width much wider than without equalization and therefore minimizing ISI, as shown in FIGS. 7A-7C. FIGS. 7A, 7B and 7C illustrate a pulse response at a TX output, an RX input, and an equalizer output, respectively, of an equalizer according to various embodiments of the present disclosure.

By comparing FIGS. 7C and 1C, one can see that the pulse in FIGS. 7C and 1C have the same duration at zero crossing (therefore same ISI), however the amplitude of the peak pulse is larger in 7C as compared to 1C respectively.

Thus, some programmable passive peaking equalizers according to various embodiments of the present disclosure have one or more of the following characteristics:
  Added peaking can compensate for losses in signal path (channel, package, die)
  High frequency is amplified to flatten the amplitude of output data (equalization)
  No extra power is required to compensate for signal loss
  No active device in signal path (active devices add noise and distortions)

A passive receive equalization circuit according to an example embodiment can be used to compensate for the frequency distortion of a data link. In an embodiment, this is done by flattening the amplitude response of the channel, which includes a transmission line, a package and an on-chip interconnect.

Since various embodiments of the disclosed equalizer are passive, they consume little to no power. In some embodiments, this can offer a unique advantage over traditional analog equalizers (CTLE).

Figure 8:
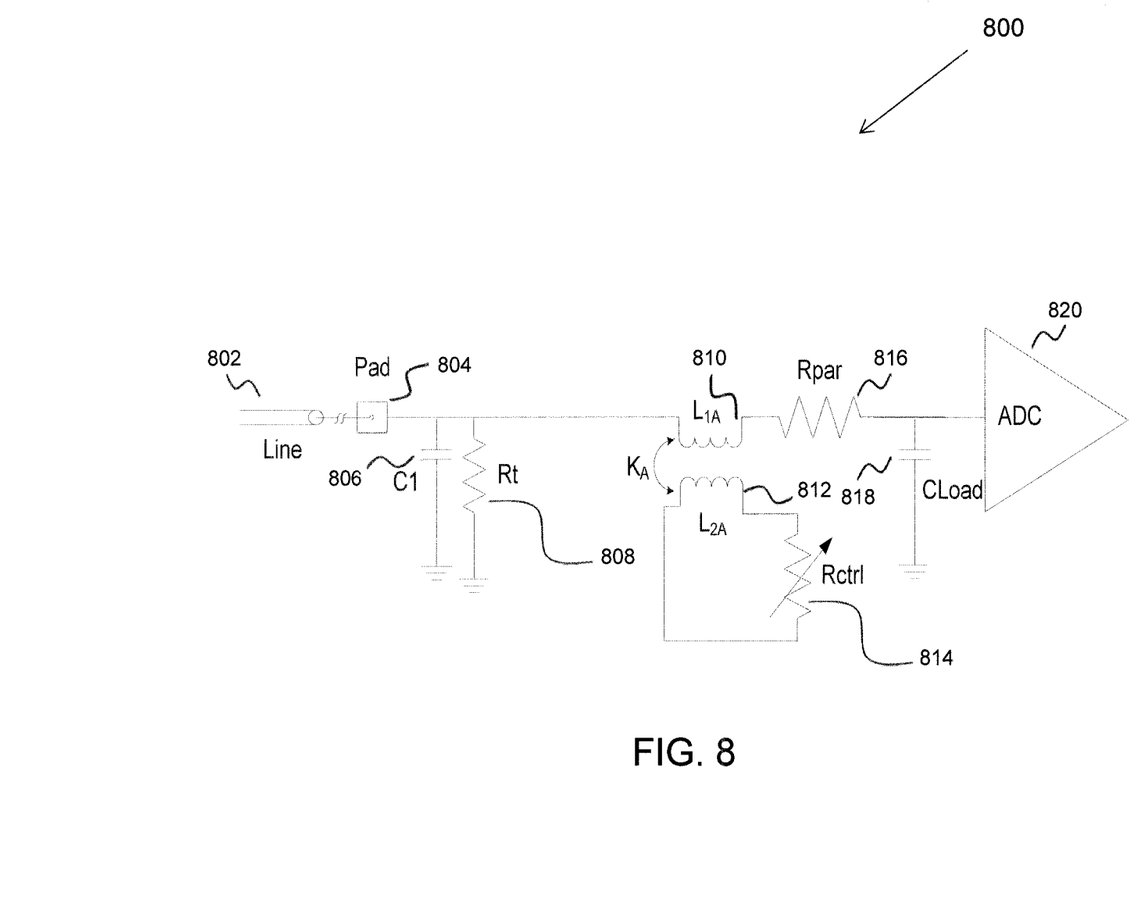
FIG. 8 illustrates a receiver using programmable passive peaking equalizer of an embodiment of the present disclosure.

A receiver peaking equalizer according to an embodiment of the present disclosure provides a boost at high frequency with minimal low-frequency loss to minimize a swing loss, before reaching an ADC. FIG. 8 illustrates a receiver 800 using a programmable passive peaking equalizer according to various embodiments of present disclosure. A transmission line 802 is coupled to pad 804. Capacitor 806 and resistor 808 represent the capacitance and resistance, respectively, associated with the pad 804. Receiver 800 includes an equalizer which is comprised of inductor 810, inductor 812, and variable resistor 814, which in some embodiments is a programmable resistor. Resistor 816 represents parasitic resistance. Capacitor 818 represents the input capacitance of ADC 820. In various embodiments the ADC forms part of the receiver. In some embodiments, a preferred or optimum peaking value can be manually adjusted or an LMS adaptation algorithm can be used.

Being a peaking equalizer, an embodiment of the present disclosure provides signal boost using low-Q complex poles, thus the equalizer would introduce some phase distortion. Also being narrowband in nature, in various embodiments, the boost frequency is designed to be around the frequency where most improvement is required. In some embodiments, the peaking magnitude is adjustable, while the shape of the response is not. Thus the matching of inverse loss of the whole channel, such as would be the case for an ideal equalizer, is not possible in various embodiments. It is worth mentioning that most practical equalizers, including active equalizers, cannot achieve this either.

In an embodiment, when the equalizer is used at the minimum setting it provides bandwidth (BW) improvement by splitting capacitance of an input pad (PAD) and a capacitance of electrostatic discharge protection (ESD).

In an embodiment, the equalizer provides bandwidth (BW) improvement by splitting capacitance of an input pad (PAD) and a capacitance of electrostatic discharge protection (ESD) from an input capacitance of an ADC. In various embodiments, the input capacitance of the ADC is relatively large.

FIG. 4, described earlier, shows an example physical circuit according to various embodiments of the present disclosure. Some embodiments of this programmable passive peaking circuit are intended to be used as an equalizer in the receive path of SerDes (serializer-deserializer) systems. It can be applied to systems employing single-ended or differential signaling, and is particularly suited to multi-gigabit serial communication links.

The data rate of serial links continues to increase with every technology generation and the performance of these systems will become increasingly limited by signal integrity issues. Interfacing the high-speed IC with external transmission lines (PCB traces, backplanes, cables) will become much more difficult at these high data rates. Similarly, on-chip attenuation between the input pad and the actual receiver circuitry will distort the signal. Thus, the performance and commercial viability of these systems will be dependent on how well these serial links move high-speed serial data signals on and off chip. Thus, some embodiments of the present disclosure will also apply to high-speed serial receivers in the future as data rates are continually increasing.

Embodiments of the present disclosure provide an alternative to the existing passive and active equalizers. Although some active equalizers can compensate well for ISI and in some cases better than some embodiments disclosed herein, such equalizers utilize considerable power and are more complicated than various embodiments disclosed herein. Some embodiments described herein, in contrast to active equalizers, only use passive elements and thus, the only cost is the area involved in implementing these structures. This can be very important for future low-power applications.

Examples of applications for embodiments of the present disclosure include any integrated circuit receiver that is required to receive high-speed serial data signals from off-chip sources.

The present disclosure describes embodiments of a high speed programmable passive peaking equalizer. Such embodiments could be used to replace or supplement DSP equalization with no power penalty.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A programmable passive peaking equalizer comprising:
a first input port;
a first output port;
a first output capacitor coupled to the first output port and a common node;
a first inductor coupled between the first input port and the first output port;
a second inductor magnetically coupled to the first inductor, the second inductor coupled to a first variable resistance and the common node;
wherein:
when the first variable resistance is set to a first resistance value, a first voltage gain between the first input port and the first output port is at least 4 dB at a first resonance frequency of the first inductor and first output capacitor; and
when the first variable resistance is set to a second resistance value that is less than the first resistance value, a second voltage gain between the first input port and the first output port is 0 dB at the first resonance frequency of the first inductor and first output capacitor;
wherein the first and second voltage gains are measured relative to 0 Hz;
a second input port;
a second output port;
a second output capacitor coupled to the first output port and the common node;
a third inductor coupled between the second input port and the second output port;
a fourth inductor magnetically coupled to the third inductor, the fourth inductor coupled to a second variable resistance and the common node;
wherein:
when the second variable resistance is set to a third resistance value, a third voltage gain between the second input port and the second output port is at least 4 dB at a second resonance frequency determined by the second inductor and second output capacitor; and
when the second variable resistor is set to a fourth resistance value that is less than the third resistance value, a fourth voltage gain between the second input port and the second output port is 0 dB at the second resonance frequency determined by the second inductor and second output capacitor;
wherein the third and fourth voltage gains are measured relative to 0 Hz.

2. The equalizer of claim 1, wherein at least one of the first, second, third, and fourth inductors comprise on-chip spiral inductors.

3. The equalizer of claim 1, wherein at least one of the first and second variable resistances comprises an array of poly resistors.

4. The equalizer of claim 1, wherein the equalizer comprises only passive elements.

5. The equalizer of claim 1, wherein the equalizer forms a part of a receive path of a serializer-deserializer.

6. The equalizer of claim 1, wherein the first variable resistance is programmable to any value between first and second resistance values.

7. The equalizer of claim 1, wherein at least one of the first and second variable resistances is digitally programmable.

8. The equalizer of claim 1, wherein the equalizer is coupled to an analog to digital converter (ADC), the ADC having a capacitance, and wherein the equalizer splits an input pad (PAD) and electrostatic discharge protection (ESD) capacitance from a large ADC capacitance.

9. The equalizer of claim 1, wherein the equalizer is programmable to adjust the amount of any one of the first, second, third, and fourth voltage gains at a Nyquist frequency of a data rate.

10. The equalizer of claim 1, wherein the second variable resistance is programmable to any value between third and fourth resistance values.

* * * * *